United States Patent
Foskey et al.

(10) Patent No.: US 11,325,719 B2
(45) Date of Patent: May 10, 2022

(54) LIFT ENGINE AUXILIARY THRUST SYSTEM FOR STOP FOLD AIRCRAFT

(71) Applicant: Bell Textron Inc., Fort Worth, TX (US)

(72) Inventors: Christopher Edward Foskey, Keller, TX (US); Colton Gilliland, Northlake, TX (US)

(73) Assignee: Textron Innovations Inc., Providence, RI (US)

( * ) Notice: Subject to any disclaimer, the term of this patent is extended or adjusted under 35 U.S.C. 154(b) by 303 days.

(21) Appl. No.: 16/792,997

(22) Filed: Feb. 18, 2020

(65) Prior Publication Data

US 2021/0253233 A1  Aug. 19, 2021

(51) Int. Cl.
| | |
|---|---|
| B64D 35/04 | (2006.01) |
| B64C 29/00 | (2006.01) |
| B64C 11/28 | (2006.01) |
| B64C 27/26 | (2006.01) |

(52) U.S. Cl.
CPC ............ *B64D 35/04* (2013.01); *B64C 11/28* (2013.01); *B64C 29/0033* (2013.01); *B64C 27/26* (2013.01); *B64C 2201/088* (2013.01)

(58) Field of Classification Search
CPC ......... B64D 35/04; B64C 11/46; B64C 11/48; B64C 11/50; B64C 27/10; B64C 27/12
See application file for complete search history.

(56) References Cited

U.S. PATENT DOCUMENTS

| | | | | |
|---|---|---|---|---|
| 5,738,301 | A | * | 4/1998 | Francois ................ B64C 27/26 244/17.19 |
| 8,998,125 | B2 | | 4/2015 | Hollimon |
| 9,701,406 | B2 | | 7/2017 | Robertson |
| 10,336,447 | B2 | | 7/2019 | Tzeng |
| 10,526,068 | B2 | | 1/2020 | Schank |
| 2014/0312177 | A1 | * | 10/2014 | Gaonjur ................ B64C 27/26 244/7 A |
| 2016/0229531 | A1 | * | 8/2016 | Robertson ............. B64C 39/04 |
| 2017/0297679 | A1 | * | 10/2017 | Elliott ..................... F16D 48/06 |

\* cited by examiner

*Primary Examiner* — Richard R. Green
*Assistant Examiner* — William L Gmoser
(74) *Attorney, Agent, or Firm* — Fogarty LLP

(57) ABSTRACT

Embodiments are directed to a selectable drive system that allows a rotor gearbox to send torque to a proprotor assembly and/or through a multiplier planetary gear set to a pylon-mounted ducted fan thrust unit. The rotor drive system may be a stop-fold system in which rotor blades can be folded when not rotating. This allows a normally idle lift engine to provide additional aircraft thrust during cruise where an aircraft is typically using only a dedicated thrust engine for high speed flight. An inline engage/disengage actuator or "shift fork" on the rotor gearbox is used to select the torque-output direction. The multiplier planetary gear set increases the output RPM that is received from the rotor gearbox and that is applied to the thrust fan unit.

17 Claims, 11 Drawing Sheets

LIFT ENGINE AUXILIARY THRUST SYSTEM FOR STOP FOLD AIRCRAFT

BACKGROUND

Fixed-wing aircraft, such as airplanes, are capable of flight using wings that generate lift in response to the forward airspeed of the aircraft. The forward airspeed is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft.

Tiltrotor aircraft are hybrids between traditional helicopters and traditional propeller driven aircraft. During airplane mode of the tiltrotor, forward speed and range is limited by certain fundamental limitations of the rotor systems.

SUMMARY

Embodiments are directed to a selectable drive system that is integrated into a rotor drive system that allows a rotor gearbox to send torque to a proprotor assembly and/or through a multiplier planetary gear set to a pylon-mounted ducted fan thrust unit. The rotor drive system may be a stop-fold system in which rotor blades can be folded when not rotating. This allows a normally idle lift engine to provide additional aircraft thrust during cruise where an aircraft is typically using only a dedicated thrust engine for high speed flight. An inline engage/disengage actuator or "shift fork" on the rotor gearbox is used to select the torque-output direction. The multiplier planetary gear set increases the output RPM that is received from the rotor gearbox and applied to the thrust fan unit.

In another embodiment, a foldable rotor system for a rotorcraft comprises a rotor assembly comprising one or more foldable rotor blades that are configured to move between an extend position and a folded position. An auxiliary fan is configured to generate thrust for an aircraft, and a proprotor gearbox is configured to be selectively coupled either to the rotor assembly or to the auxiliary fan.

The proprotor gearbox further comprises a multiplier planetary gear drive having an output coupled to the auxiliary fan. The multiplier planetary gear drive is configured to increase an output revolutions per minute compared to an input revolutions per minute. The proprotor gearbox further comprises an inline engagement actuator that is configured to selectively couple the proprotor gearbox either to the rotor assembly or to the auxiliary fan.

A pylon may enclose the rotor assembly, auxiliary fan, and proprotor gearbox. An inlet duct on the pylon is configured to provide airflow to the auxiliary fan. The pylon may be mounted on a wing of an aircraft. The pylon is configured to rotate between a vertical position and a horizontal position. Rotating the extended rotor blades in the pylon-vertical position generates a lift force. Rotating the extended rotor blades in the pylon-horizontal position generates a thrust force configured to drive the foldable rotor system in a forward direction.

The foldable rotor system may further comprise an engine configured to generate torque and a rotor drive system that is configured to distribute the torque from the engine to the proprotor gearbox. The proprotor gearbox is adapted to the torque either to the rotor assembly or to the auxiliary fan.

In a further embodiment, an aircraft comprises a fuselage, a wing attached to the fuselage at a first end of the wing, and a proprotor assembly having a plurality of rotor blades mounted on a second end of the wing. The rotor blades may be moved between an extend position and a folded position. An auxiliary fan is mounted on the second end of the wing. The auxiliary fan generates thrust for an aircraft. A proprotor gearbox is coupled to the rotor assembly or to the auxiliary fan. A first engine generates torque. A rotor drive system distributes the torque from the first engine to the proprotor gearbox. The proprotor gearbox is adapted to the torque either to the rotor assembly or to the auxiliary fan. The aircraft may further comprise a second engine that generates a thrust force adapted to drive the aircraft in a forward direction.

The proprotor gearbox further comprises a multiplier planetary gear drive having an output coupled to the auxiliary fan. The multiplier planetary gear drive increases an output revolutions per minute compared to an input revolutions per minute. The proprotor gearbox further comprises an inline engagement actuator that selectively couples the proprotor gearbox either to the rotor assembly or to the auxiliary fan. The proprotor gearbox may also be coupled to both the rotor assembly and to the auxiliary fan simultaneously.

A pylon encloses the rotor assembly, auxiliary fan, and proprotor gearbox. An inlet duct on the pylon provides airflow to the auxiliary fan. The pylon may rotate between a vertical position and a horizontal position. The extended rotor blades generate a lift force in the pylon-vertical position and generate a thrust force in the pylon-horizontal position. The thrust force is configured to drive the aircraft in a forward direction.

BRIEF DESCRIPTION OF THE DRAWINGS

Figure 1A:
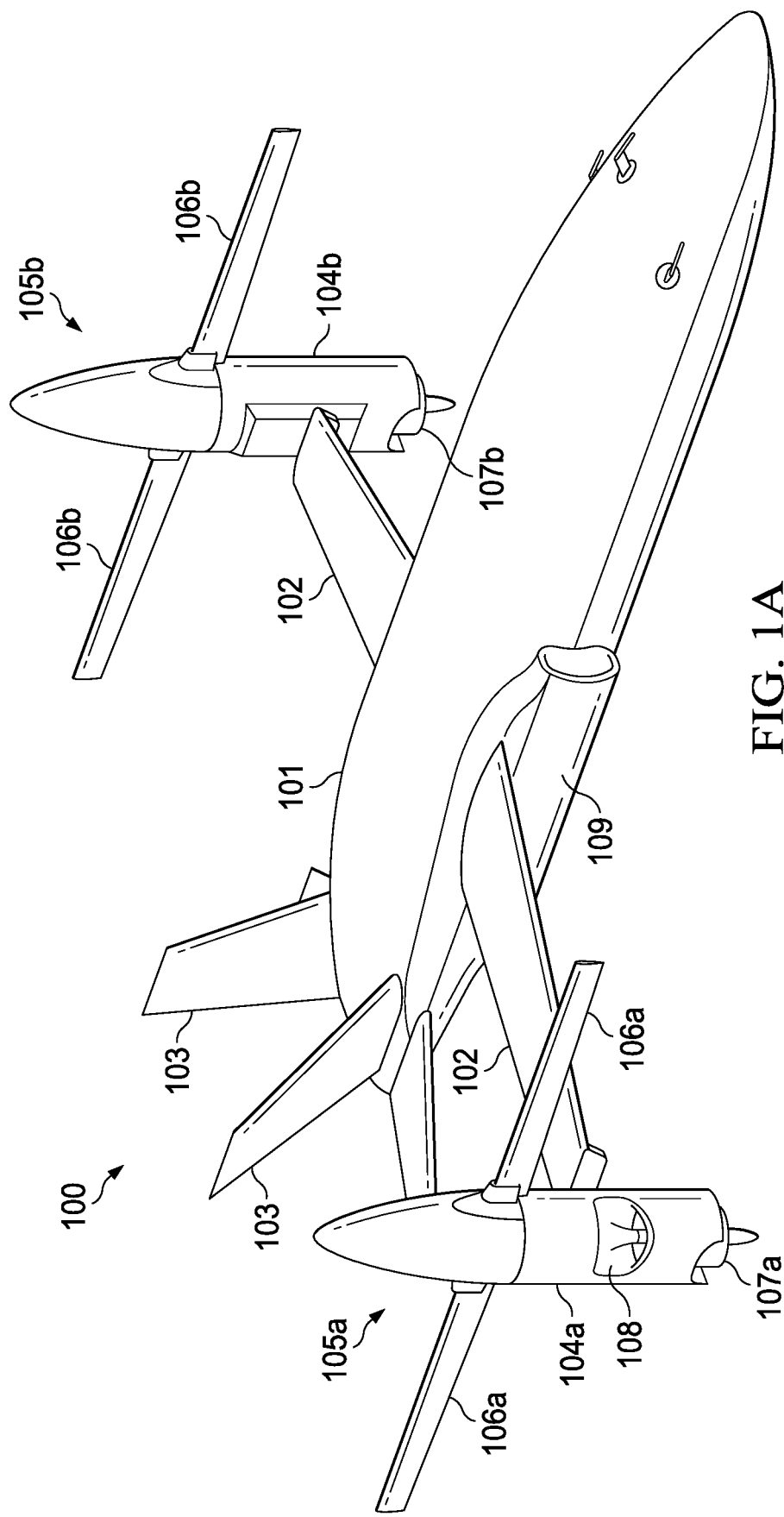

Having thus described the invention in general terms, reference will now be made to the accompanying drawings, which are not necessarily drawn to scale, and wherein:

FIG. 1A illustrates a tiltrotor aircraft in VTOL or helicopter flight mode.

Figure 1B:
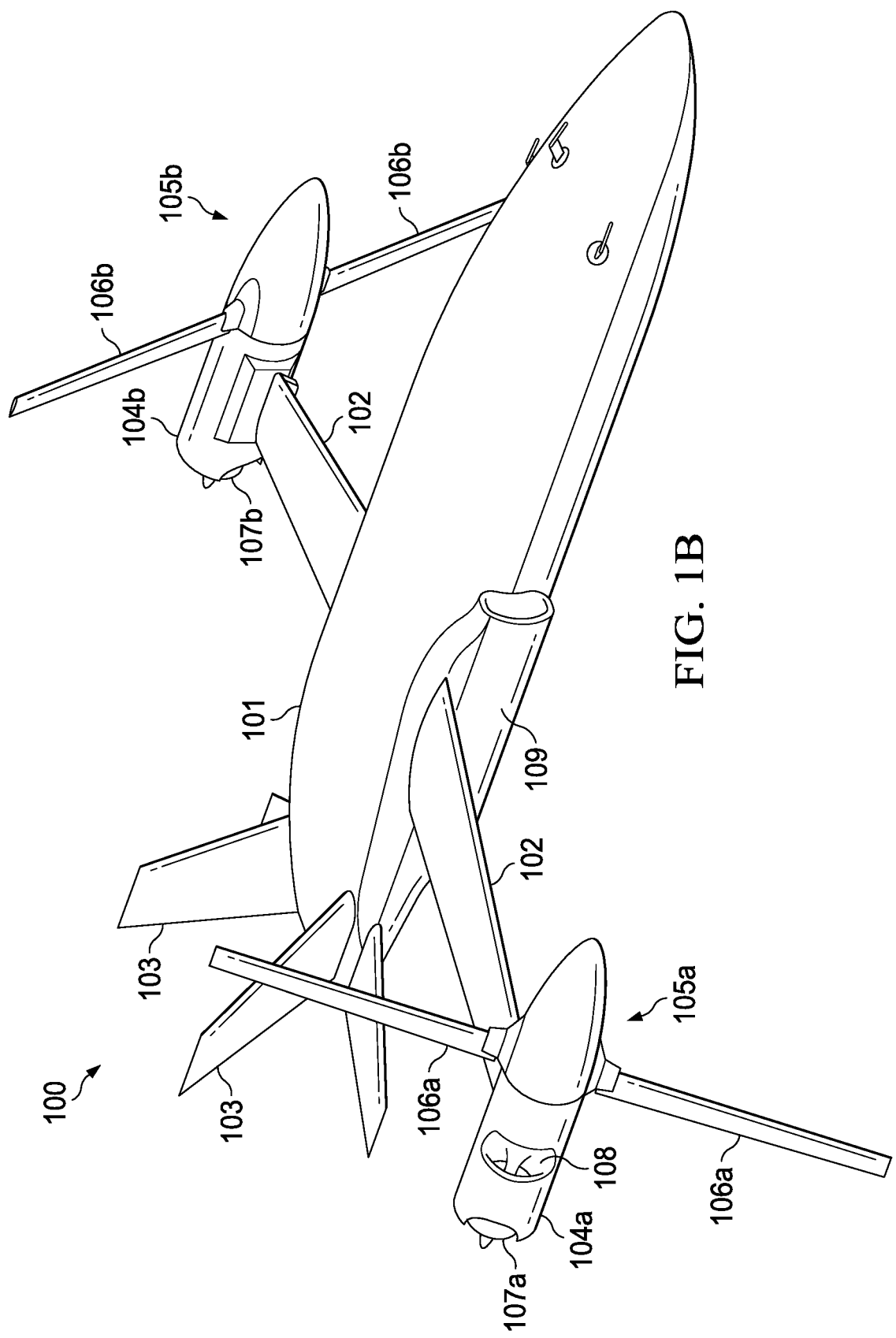

FIG. 1B illustrates the tiltrotor aircraft of FIG. 1A in proprotor forward flight mode.

Figure 1C:
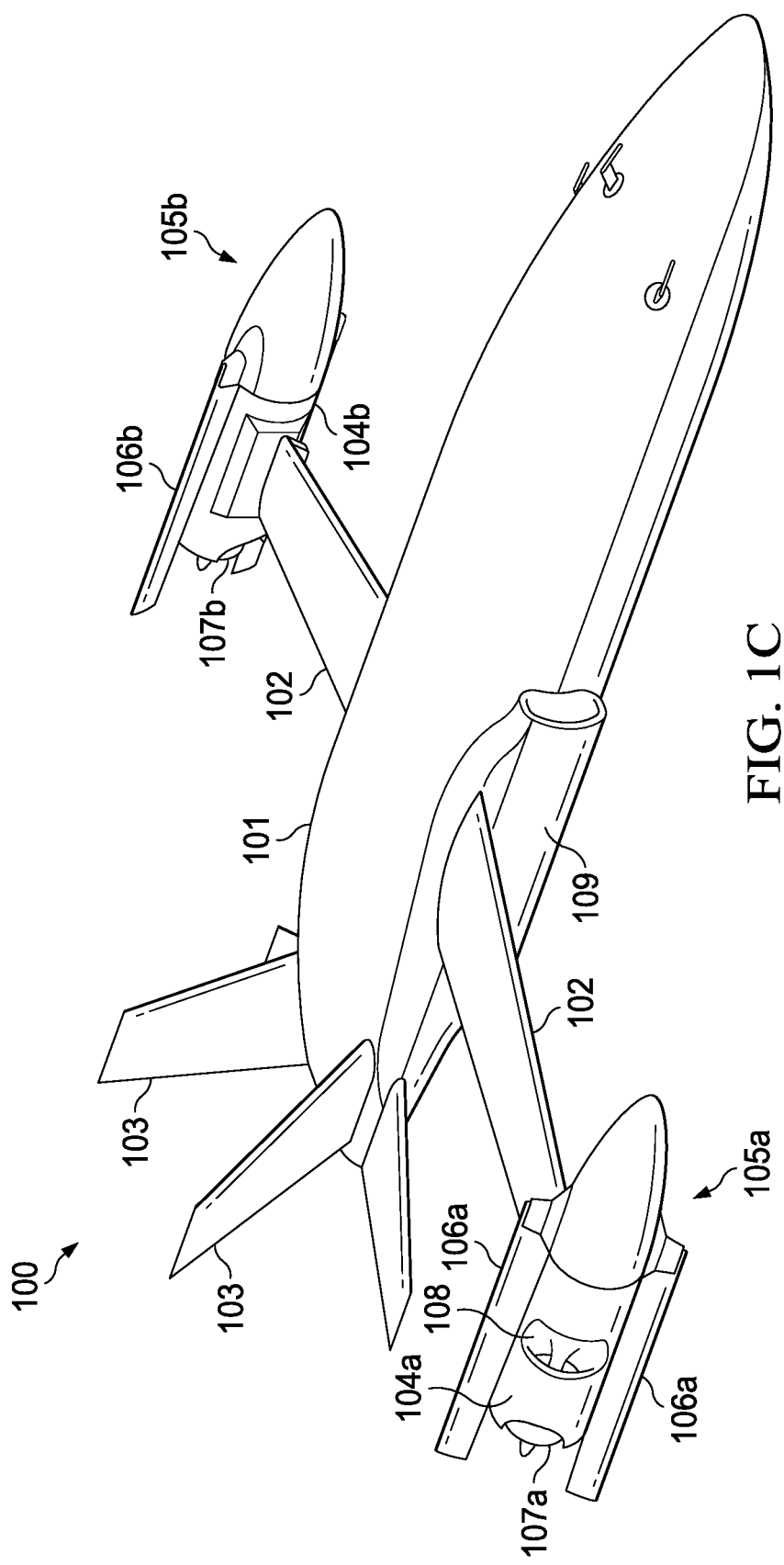

FIG. 1C illustrates the tiltrotor aircraft of FIG. 1B wherein the proprotor blades on the proprotor assemblies have been folded to be oriented substantially parallel to respective pylon assemblies.

Figure 1D:
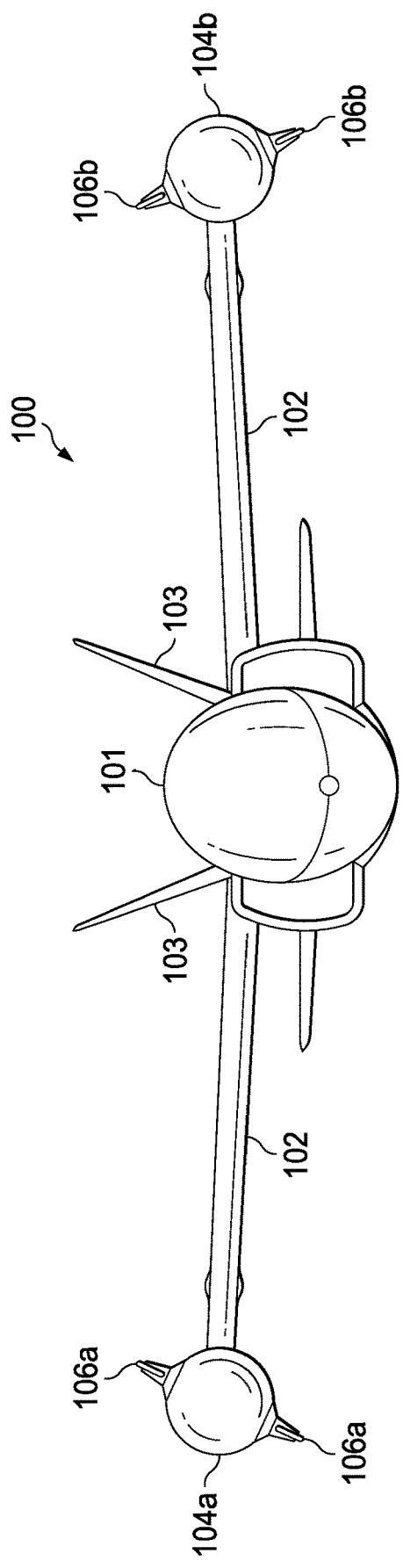

FIG. 1D illustrates a front view of the tiltrotor aircraft of FIG. 1C.

Figure 2B:
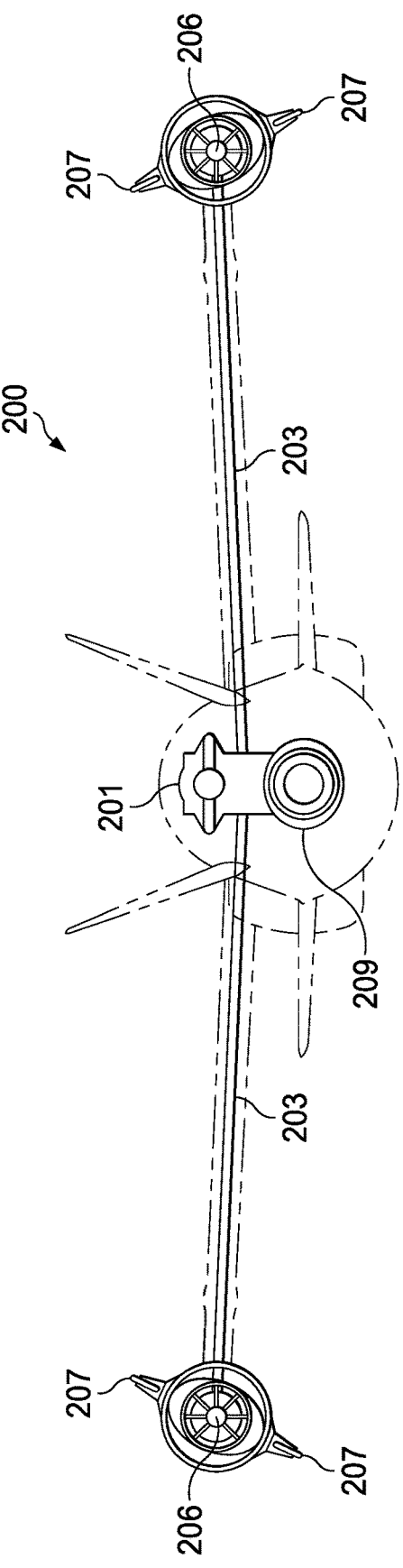
Figure 2A:
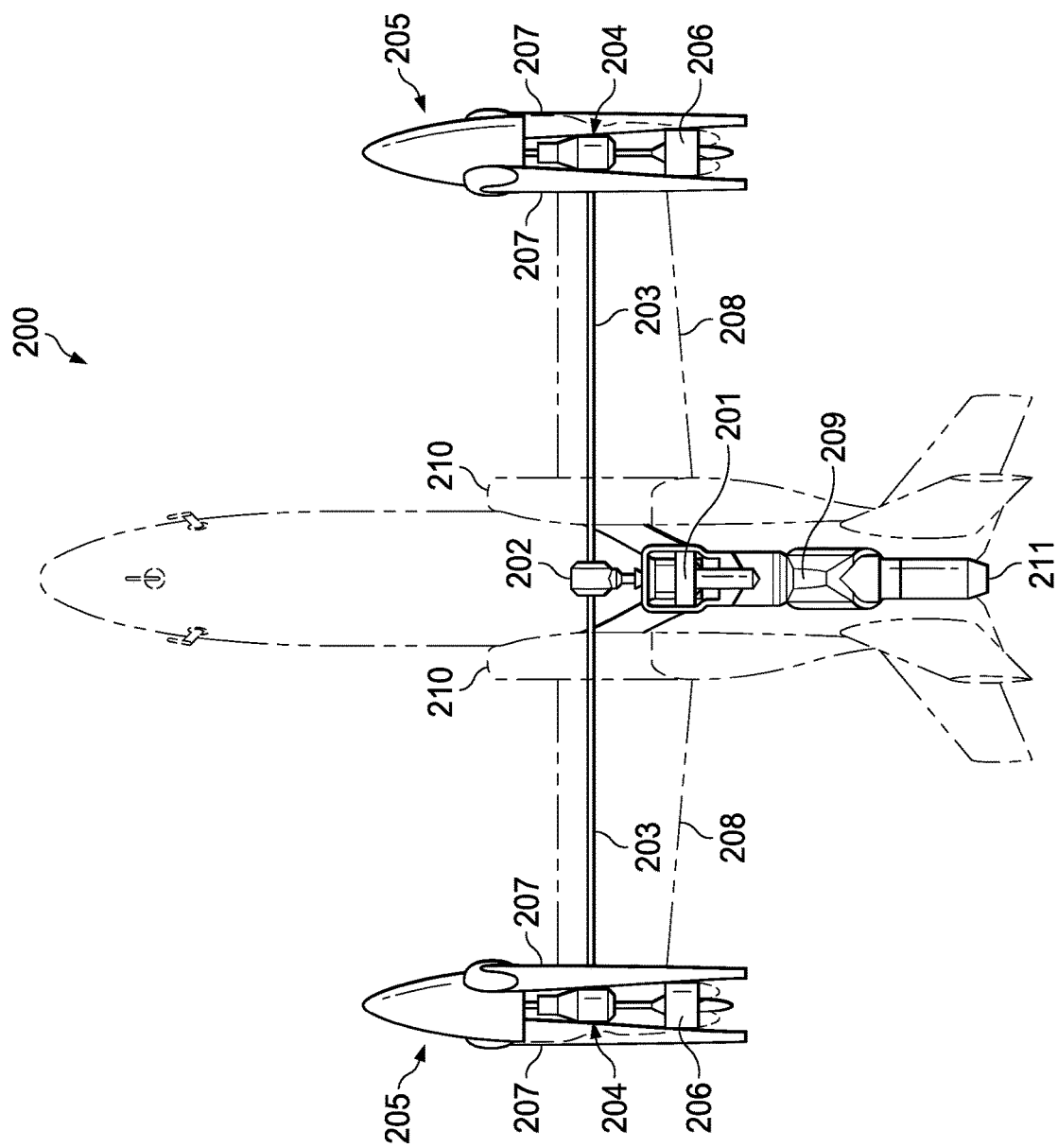
Figure 2C:
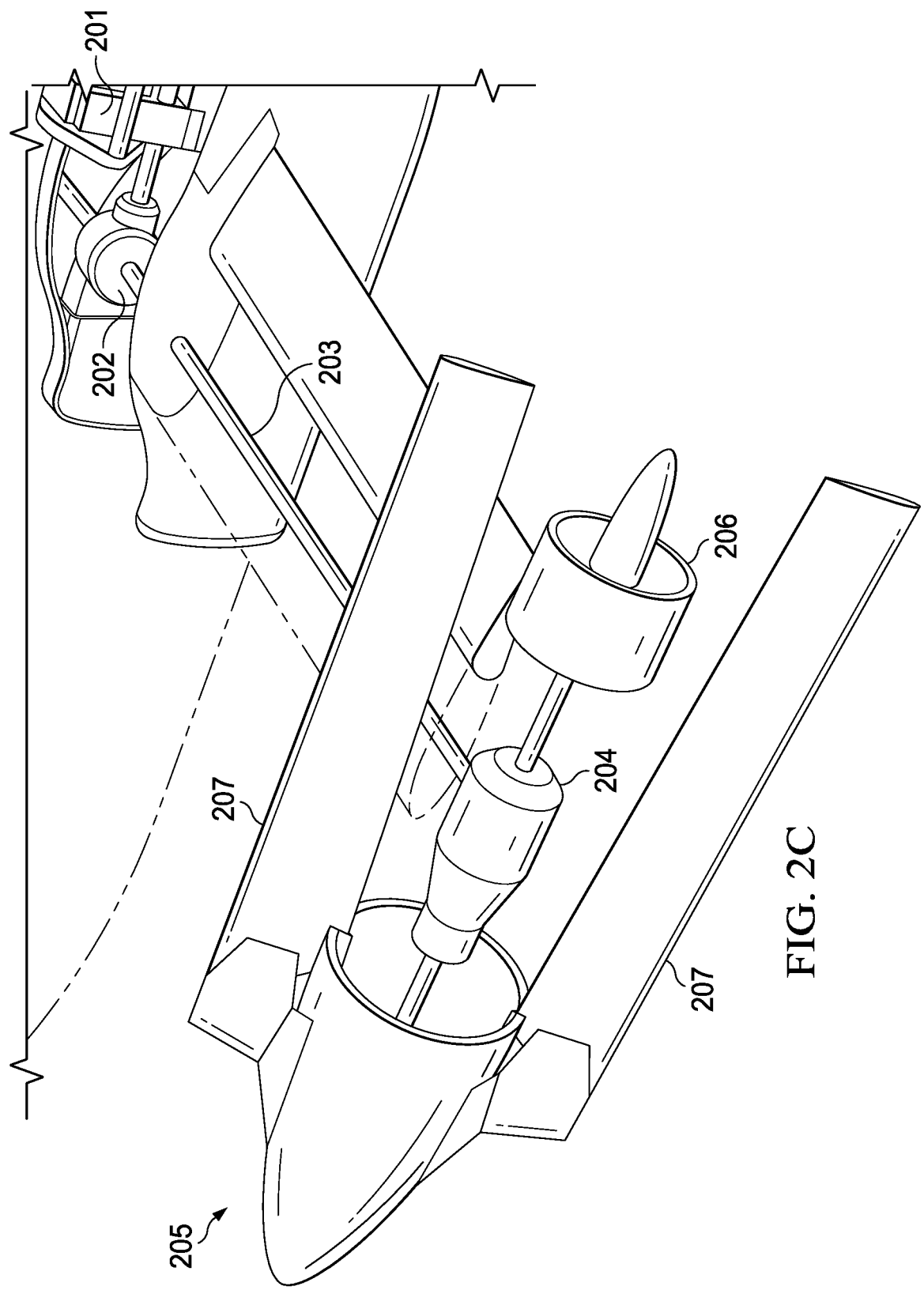

FIGS. 2A-C illustrate components of the lift drive system and thrust drive system in an example embodiment.

Figure 3A:
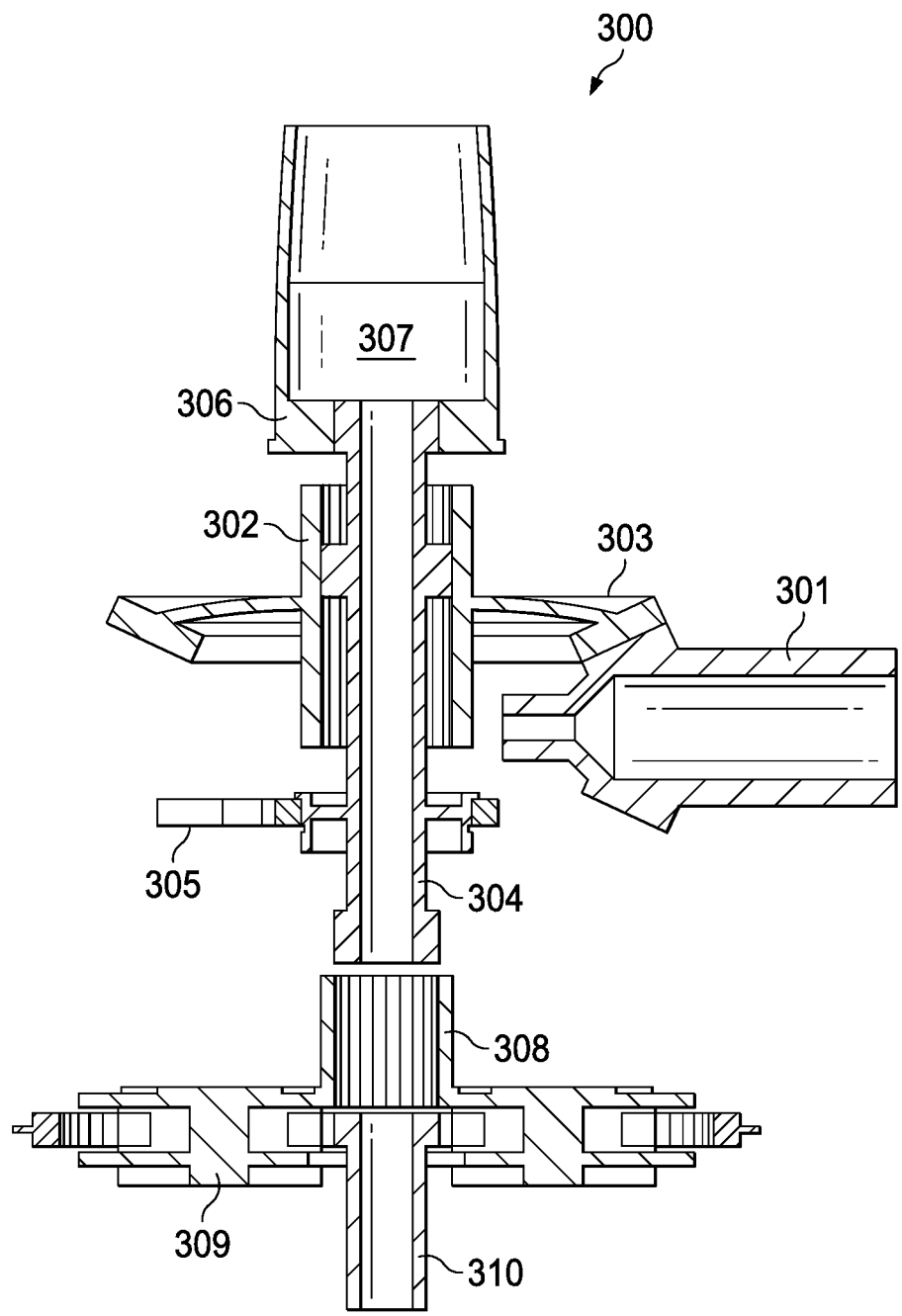
Figure 3B:
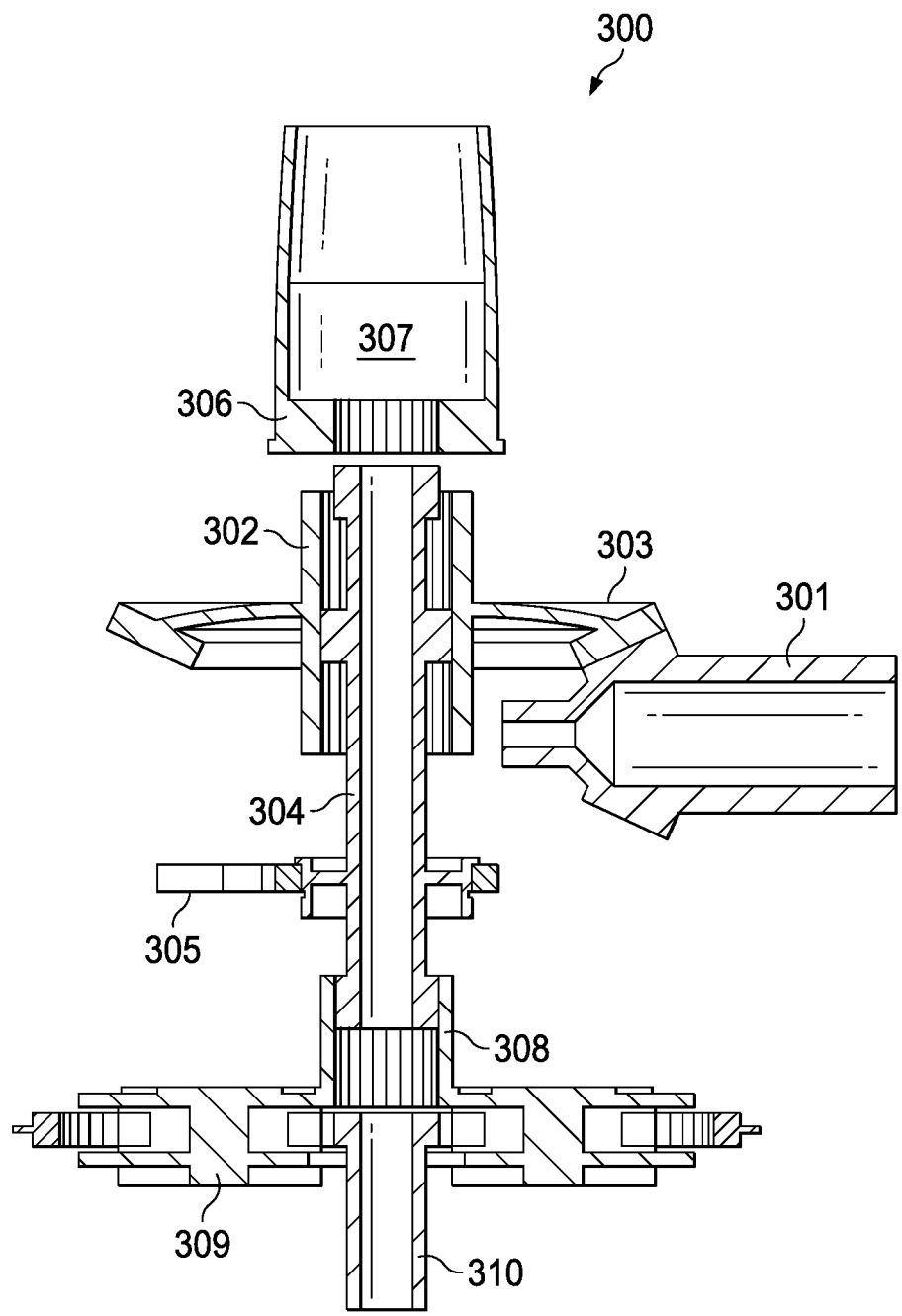

FIGS. 3A and 3B are cross-section views of a rotor gearbox according to an example embodiment.

Figure 4A:
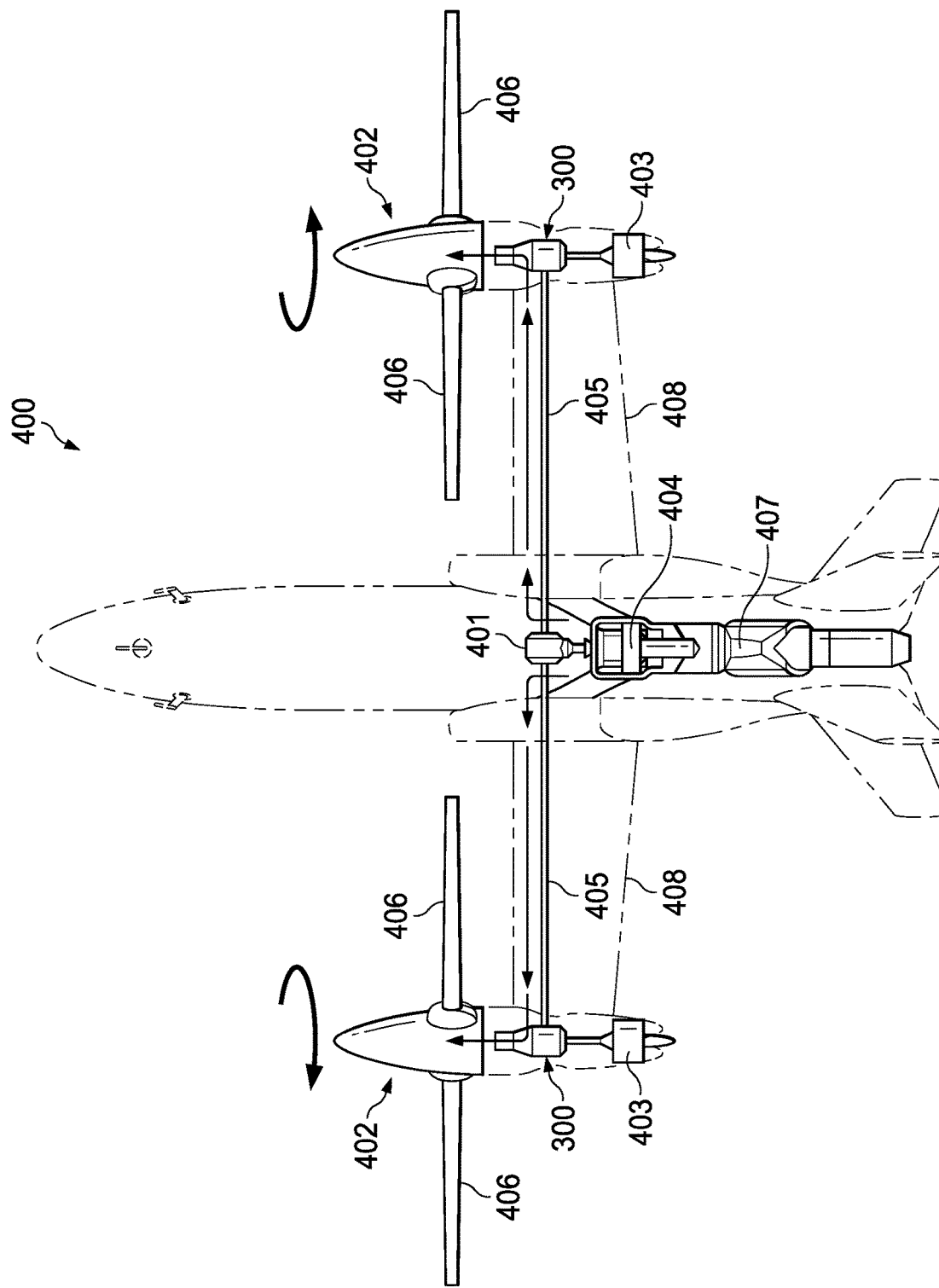
Figure 4B:
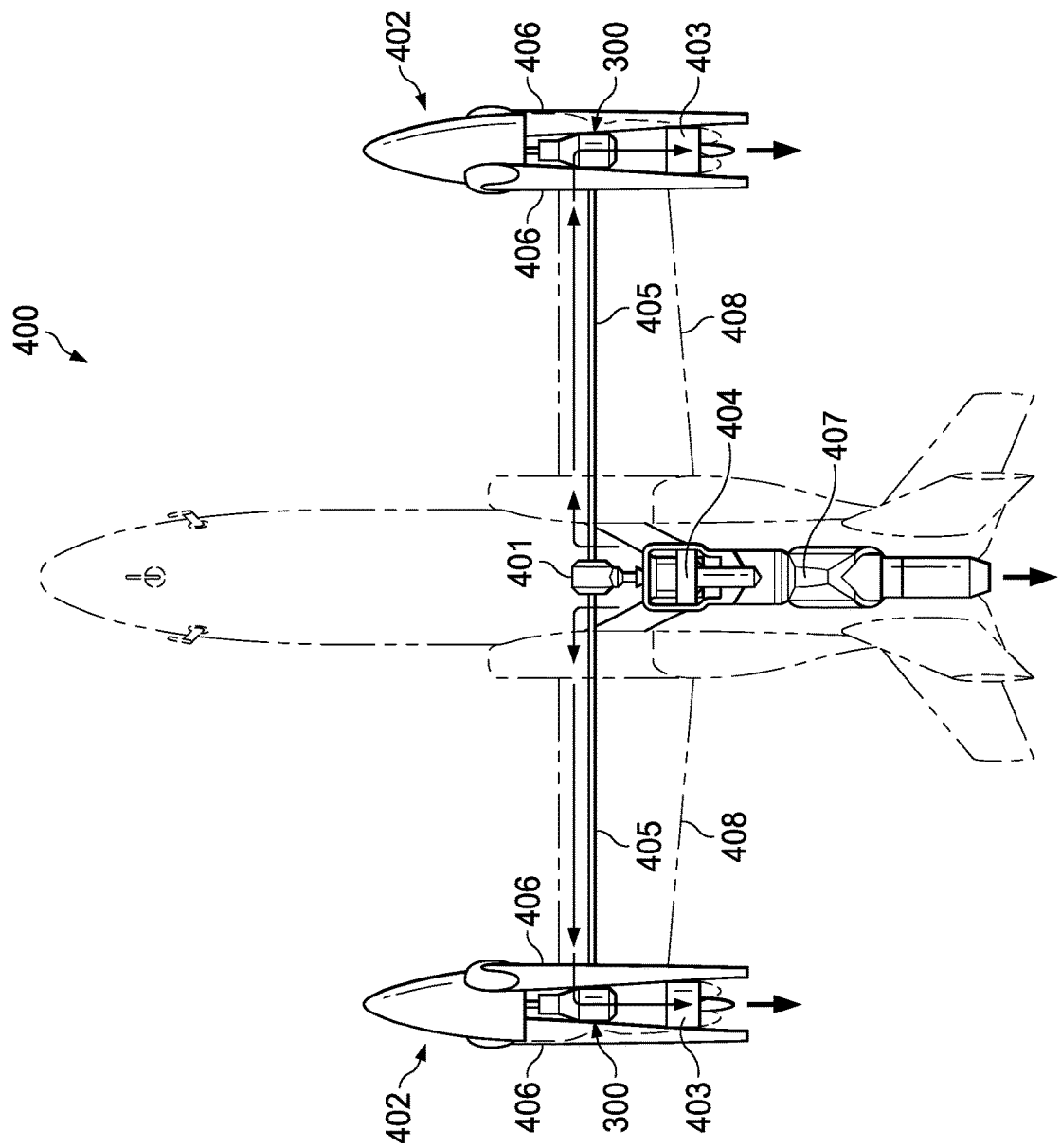

FIGS. 4A and 4B illustrate the torque path from lift engine in an aircraft having both proprotors and auxiliary thrust fans.

Figure 5:
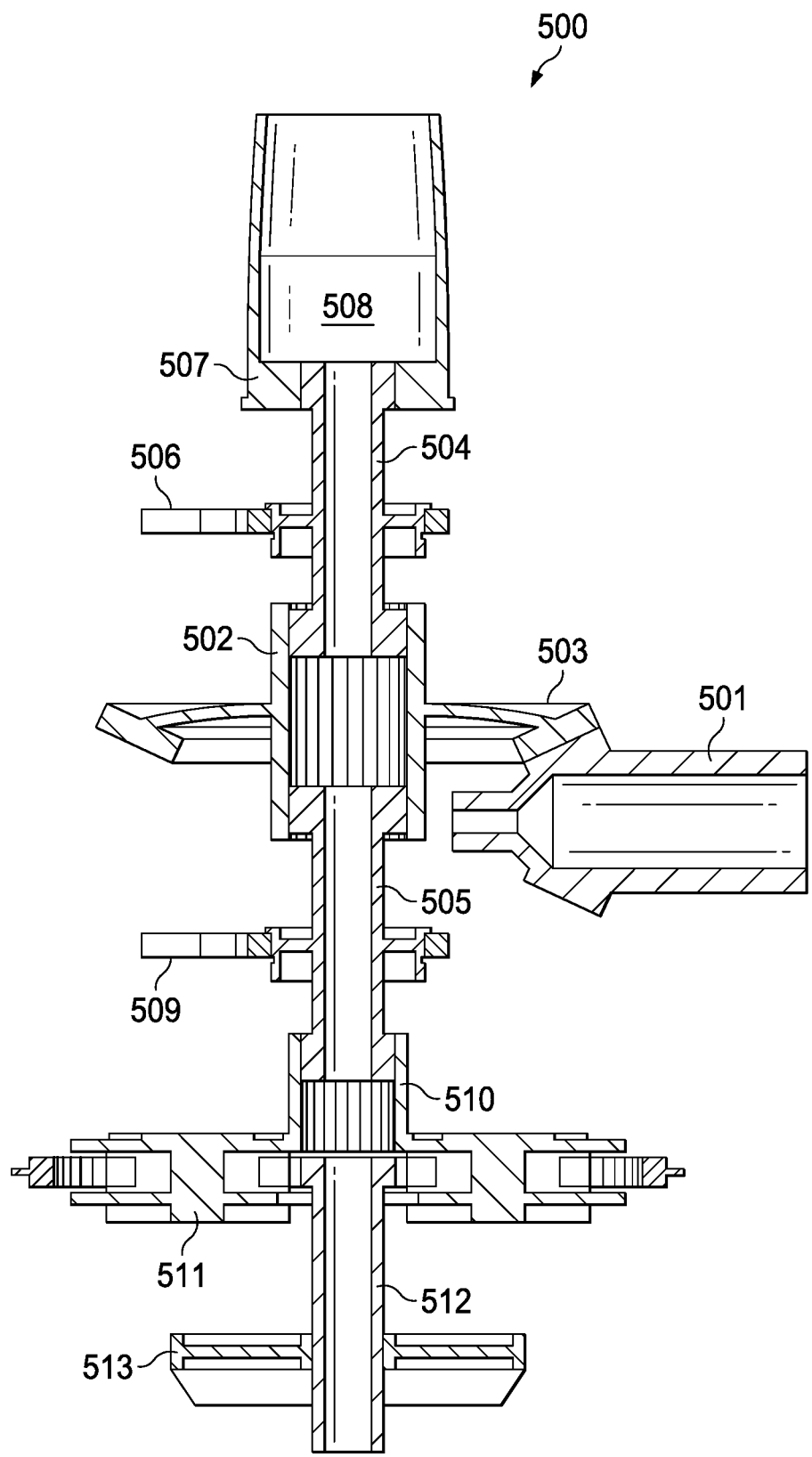

FIG. 5 is a cross-section views of a simplified rotor gearbox configured to be coupled to both a rotor assembly and to an auxiliary fan simultaneously.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1D, a tiltrotor aircraft is schematically illustrated and generally designated 100. Aircraft 100 includes a fuselage 101, wings 102 and tail assembly 103. The wings 102 and tail assembly 103 may include control surfaces, such as ailerons, flaps, slats, spoilers, elevators, rudders, or ruddervators, operable for horizontal and/or vertical stabilization during forward flight. Pylon assemblies 104a, 104b are located at the outboard ends of wing 102 and are rotatable relative to wings 102 between a generally vertical orientation, as best seen in FIG. 1A, and a generally horizontal orientation, as best seen in FIGS. 1B-1D. The entire pylon assembly 104a, 104b may rotate relative to wing 102, as illustrated in FIG. 1A. In other embodiments, pylon assemblies 104a, 104b may comprise a fixed portion that is attached to wing 102 and a moveable portion that rotates or pivots relative to wing 102.

Pylon assemblies 104a, 104b each house a portion of a drive system that is used to rotate proprotor assemblies 105a, 105b, respectively. The drive system may comprise, for example, engines within fuselage 101 that are coupled to each of the proprotor assemblies 105a, 105b via linkages in wing 102 and pylon assemblies 104a, 104b. Each proprotor assembly 105a, 105b includes a plurality of proprotor blades 106a, 106b that are operable to be rotated, operable to be feathered, and operable to be folded.

Pylon assemblies 104a, 104b further house a high speed ducted fan thrust unit 107a, 107b that is integrated into pylons 104a, 104b. A lift engine (not shown) in fuselage 101 can be configured to drive proprotor assembly 105a, 105b and proprotor blades 106a, 106b or to drive the pylon-mounted ducted fan thrust units 107a, 107b. In one embodiment, multiplier planetary gear sets in pylons 104a, 104b may be used to drive ducted fan thrust units 107a, 107b using torque from the rotor drive system that normally drives proprotor assemblies 105a, 105b. The ducted fan thrust units 107a, 107b use inlet air from a conformal inlet or a forward-facing scoop 108 on pylons 104a, 104b. Conformal inlets 108 take in air from the free stream passing over pylon assemblies 104a, 104b. Pylon assemblies 104a, 104b with the conformal inlets 108 have similar frontal area compared to conventional stop-fold pylons without ducted thrust fans. Therefore, pylon assemblies 104a, 104b add minimal or no drag to aircraft 100 compared to existing stop-fold aircraft. The folded position of rotor blades 106a, 106b may be configured to avoid conformal inlets 108 in order to optimize the airflow available to ducted fan thrust units 107a, 107b.

The ducted fan thrust units 107a, 107b allow a normally idle lift engine to provide additional aircraft thrust during cruise flight when aircraft 100 would otherwise only use a dedicated thrust engine (not shown) for high speed flight. Inlets 109 on fuselage 101 provide airflow to the internal thrust engine.

FIG. 1A illustrates aircraft 100 in VTOL or helicopter flight mode, in which pylons 104a, 104b are configured in a vertical position and proprotor blades 106a, 106b rotate in a substantially horizontal plane to provide a lifting thrust, such that aircraft 100 flies much like a conventional helicopter.

FIG. 1B illustrates aircraft 100 in a forward flight mode, in which pylons 104a, 104b have been rotated forward to a horizontal position so that proprotor blades 106a, 106b are rotating in a substantially vertical plane to provide a forward thrust thereby enabling wings 102 to provide a lifting force responsive to forward airspeed, such that aircraft 100 flies much like a conventional propeller driven aircraft.

In the rotary flight modes, proprotor assemblies 105a, 105b rotate in opposite directions to provide torque balancing to aircraft 100. For example, when viewed from the front of aircraft 100 in proprotor forward flight mode (FIG. 1B) or from the top in helicopter mode (FIG. 1A), proprotor assembly 105a may rotate clockwise, for example, and proprotor assembly 105b may rotate counterclockwise. In the illustrated embodiment, proprotor assemblies 105a, 105b each include two proprotor blades 106a, 106b that are equally spaced apart circumferentially at approximately 180-degree intervals. It should be understood by those having ordinary skill in the art, however, that the proprotor assemblies 105a, 105b of the present disclosure may have proprotor blades with other designs and other configurations including, for example, proprotor assemblies having three, four, five or more proprotor blades. In addition, it should be appreciated that aircraft 100 can be operated such that proprotor assemblies 105*a*, 105*b* are selectively positioned between proprotor forward flight mode and helicopter mode, which can be referred to as a conversion flight mode.

While in the configuration illustrated in FIG. 1B, aircraft 100 may transition between a proprotor-driven forward-flight mode and a thrust-driven forward-flight mode. The thrust engine is engaged and initially supplements the proprotor assemblies 105*a*, 105*b*. Then lift engine in fuselage 101 is disengaged from proprotor assemblies 105*a*, 105*b*. The proprotor blades 106*a*, 106*b* of proprotor assemblies 105*a*, 105*b* are then feathered (i.e., oriented to be streamlined in the direction of flight). In the feathered position, the proprotor blades 106*a*, 106*b* may act as brakes to aerodynamically stop the rotation of proprotor assemblies 105*a*, 105*b*.

FIG. 1C illustrates aircraft 100 in airplane forward flight mode, in which proprotor blades 106*a*, 106*b* of proprotor assemblies 105*a*, 105*b* have been folded to be oriented substantially parallel to respective pylon assemblies 104*a*, 104*b*. This configuration minimizes the drag force generated by proprotor blades 106*b*, 106*c*. The forward cruising speed of aircraft 100 can be significantly higher in a thrust-driven airplane flight mode versus proprotor flight mode by reducing any airspeed-induced proprotor aeroelastic instability. In this configuration, thrust engine 109 provides forward thrust for aircraft 100, thereby enabling wings 102 to provide a lifting force responsive to the forward airspeed. Torque from the lift engine may be directed to thrust units 107*a*, 107*b*, which then operate in a turbofan mode to provide auxiliary or supplemental thrust for aircraft 100.

Aircraft 100 may also transition from the folded proprotor blade configuration of FIG. 1C back to proprotor flight by slowing below a maximum airspeed for proprotor deployment. Proprotor blades 106*a*, 106*b* may then be swept forward into a feathered configuration. Once all proprotor blades are deployed forward and locked into place (as illustrated in FIG. 1B), then the lift engine may be disengaged from the ducted fan thrust units 107*a*, 107*b* and again engage proprotor assemblies 105*a*, 105*b*. When torque power is applied to rotate proprotor blades 106*a*, 106*b*, aircraft 100 enters proprotor forward-flight mode. Aircraft 100 may then transition to a conversion flight mode and/or helicopter flight mode by rotating proprotor assembly 105*a*, 105*b* on pylon assemblies 104*a*, 104*b* from a horizontal orientation (FIG. 1B) to a vertical orientation (FIG. 1A).

Even though aircraft 100 has been described as having a lift engine and a thrust engine in fuselage 101, wherein the lift engine operates both of the proprotor assemblies in rotary flight mode, it should be understood by those having ordinary skill in the art that other engine arrangements are possible and are considered to be within the scope of the present disclosure. For example, in an alternative embodiment, aircraft 100 may have multiple lift engines that provide torque and rotational energy separately to proprotor assemblies 105*a*, 105*b*. In addition, even though proprotor assemblies 105*a*, 105*b* are illustrated in the context of tiltrotor aircraft 100, it should be understood by those having ordinary skill in the art that the proprotor assemblies disclosed herein can be implemented on other tiltrotor aircraft having multiple wing members 102 and other proprotor assembly configurations.

FIG. 1D is a depicts a head-on view of tiltrotor aircraft 100 in the airplane forward flight mode of FIG. 1C. Proprotor blades 106*a*, 106*b* of proprotor assemblies 105*a*, 105*b* have been folded to be oriented substantially parallel to respective pylon assemblies 104*a*, 104*b*.

Apparatus for folding rotor blades on a stop-fold aircraft are disclosed, for example, in U.S. Pat. No. 8,998,125 B2, U.S. Pat. No. 10,336,447 B2, and U.S. Pat. No. 10,526,068 B2, the disclosures of which are hereby incorporated herein by reference in their entirety.

FIGS. 2A-C are cutaway views of an aircraft 200 to illustrate components of the lift drive system and thrust drive system. A lift engine 201, such as a gas turbine engine, produces shaft power to a main gearbox 202, which in turn drives power shafts 203. Shaft power from lift engine 201 is transferred by power shafts 203 to rotor gearboxes 204 in each wingtip pylon. The rotor gearboxes 204 selectively drive either proprotor assembly 205 or auxiliary thrust fan 206. Proprotor assemblies 205 are each coupled to a plurality of rotor blades 207, which may be folded into a stowed position when rotor gearboxes 204 drive the auxiliary thrust fans 206, as shown in FIGS. 2A-C. Before rotor gearboxes 204 are selected to drive proprotor assemblies 205, rotor blades 207 are swept forward to a deployed position so that they can rotate freely without impacting wings 208.

Aircraft 200 also comprises a thrust engine 209, which may be, for example, a gas turbine engine. Thrust engine 209 has one or more air intakes 210 and an exhaust 211 that passes turbine exhaust gases to produce high velocity airflow to generates thrust. When operating in airplane mode as illustrated in FIGS. 2A-C, thrust engine 209 propel aircraft 200 forward and wings 208 generate lift to keep the aircraft airborne. Since lift engine 201 is not needed to generate lift in this configuration, the torque power generated by lift engine 201 can instead be directed to auxiliary thrust fans 206 to supplement the force generated by thrust engine 209.

As illustrated in FIGS. 2A and 2B, lift engine 201 and thrust engine 209 may be located along the centerline of aircraft 200 with lift engine 201 positioned above and forward of thrust engine 209. It will be understood that in other embodiments, the relative positions of lift engine 201 and thrust engine 209 may be modified, for example, to optimize the location of main gearbox 202 and power shafts 203 relative to lift engine 201 and/or to optimize the location of air intakes 210 and exhaust 211 relative to thrust engine 209. Additionally, in other embodiments, lift engine 201 and/or thrust engine 209 may be located off of the aircraft centerline, such as in a side-by-side configuration.

Although thrust engine 209 is shown as a gas turbine engine in FIGS. 2A-C, it will be understood that in other embodiments aircraft the thrust engine may be coupled to a propeller (not shown) that is optimized for high-speed flight while rotor blades 207 are optimized to generate lifting force. In such a configuration, the thrust propeller may provide the main forward-driving force while auxiliary fans 206 provide supplemental forward force.

In a further embodiment, thrust engine 209 may be replaced with a fan section that is driven by lift engine 201 to provide the forward thrust for aircraft mode. In this configuration, an additional drive shaft would couple lift engine 201 to the fan section. The fan section would be selectively engaged once aircraft 200 is beginning or established in forward flight mode. Once the power provide by the fan section and the airspeed are sufficient to maintain forward flight, then lift engine 201 may be decoupled from proprotor assemblies 205 and rotor blades 207 may be stowed.

FIGS. 3A and 3B are cross-section views of a simplified rotor gearbox 300 according to an example embodiment.

Gearbox 300 may be located within a wingtip pylon. Gearbox 300 rotates with the pylon between a vertical orientation for flight in helicopter mode and a horizontal orientation for flight in airplane mode.

Power shaft 301 is coupled to an aircraft lift engine, such as engine 201 in FIG. 2A. Torque from the lift engine is transferred by power shaft 301 to a drive shaft 302 by bevel gear 303. Drive shaft 302 is hollow and surrounds a selectable shaft 304. Drive shaft 302 and selectable shaft 304 are coupled by a spline so that rotation of drive shaft 302 causes corresponding rotation of selectable shaft 304. Actuator or shift fork 305 is coupled to selectable shaft 304 and is used to move selectable shaft 304 forward and back within drive shaft 302.

When shift fork 304 is moved forward, selectable shaft 304 engages a spline 306 in rotor mast 307. This allows the torque from the lift engine to be transferred via power shaft 301 to drive shaft 302 and then to mast 307. Rotating mast 307 then rotates a proprotor assembly, such as proprotor assembly 205 in FIG. 2A, which moves rotor blades. When the wingtip pylon is vertically oriented, the rotor blades generate lift, and when the pylon rotates to the horizontal orientation, the rotor blades generate thrust for forward flight.

The torque from the lift engine may be removed from mast 307 by moving shift fork 304 backward thereby disengaging selectable shaft 304 from mast 307. This corresponds to a neutral transmission configuration in which torque is not applied either to a proprotor assembly or to an auxiliary fan. If shift fork 304 is moved further backward as shown in FIG. 3B, selectable shaft 304 engages input spline 308 on step-up planetary 309. Drive shaft 302 continues to rotate selectable shaft 304 when engaged to input spline 308. Output 310 of planetary 309 is coupled to an auxiliary thrust fan, such as fan 206 in FIG. 2A. This allows the torque from the lift engine to be transferred via power shaft 301 to drive shaft 302 and then to the auxiliary thrust fan.

FIGS. 4A and 4B illustrate the torque path from lift engine 401 in an aircraft 400 having both proprotors 402 and auxiliary thrust fans 403. FIG. 4A depicts a configuration corresponding to FIG. 3A in which the shift fork 305 is moved forward so that rotor gearbox 300 engages proprotor assembly 402. Torque from lift engine 401 is then transferred by main gearbox 404 and power shafts 405 to the rotor gearboxes 300 and then to proprotor assemblies 402. This torque causes rotor blades 406 to rotate, which generates lift when the proprotor assemblies 402 are vertically oriented or generates forward thrust when the proprotor assemblies are horizontally oriented. Thrust engine 407 may or may not be used with proprotor assemblies 402; however, generally, lift engine 401 is providing the primary lift and thrust forces when used in the configuration of FIG. 4A.

FIG. 4B depicts a configuration corresponding to FIG. 3B in which the shift fork 305 is moved backward so that rotor gearbox 300 engages auxiliary thrust fan 403. Torque from lift engine 401 is then transferred by main gearbox 404 and power shafts 405 to the rotor gearboxes 300 and then to auxiliary thrust fan 403. This torque causes auxiliary thrust fan 403 to rotate, which generates supplemental thrust to augment the thrust generated by thrust engine 407. Thrust engine 407 generates the primary thrust to move aircraft 400 forward, which forces air over wings 408 to generate lift in this configuration.

FIG. 5 is a cross-section views of a simplified rotor gearbox 500 configured to be coupled to both a rotor assembly and to an auxiliary fan simultaneously. Power shaft 501 is coupled to an aircraft lift engine, such as engine 201 in FIG. 2A. Torque from the lift engine is transferred by power shaft 501 to a drive shaft 502 by bevel gear 503. Drive shaft 502 is hollow and surrounds both selectable rotor shaft 504 and selectable fan shaft 505. Drive shaft 502 and selectable rotor shaft 504 are coupled by a spline so that rotation of drive shaft 502 causes corresponding rotation of selectable rotor shaft 504. Similarly, drive shaft 502 and selectable fan shaft 505 are coupled by a spline so that rotation of drive shaft 502 causes corresponding rotation of selectable fan shaft 505

Actuator or shift fork 506 is coupled to selectable rotor shaft 504 and is used to move selectable rotor shaft 504 within drive shaft 502. When shift fork 506 is moved forward, selectable rotor shaft 504 engages a spline 507 in rotor mast 508. This allows the torque from the lift engine to be transferred via power shaft 501 to drive shaft 502 and then to mast 508. Rotating mast 508 then rotates a proprotor assembly, such as proprotor assembly 205 in FIG. 2A, which moves rotor blades. The torque from the lift engine may be removed from mast 508 by moving shift fork 506 backward thereby disengaging selectable rotor shaft 504 from spline 507.

Actuator or shift fork 509 is coupled to selectable fan shaft 504 and is used to move selectable fan shaft 505 within drive shaft 502. When shift fork 509 is moved backward, selectable rotor shaft 505 engages input spline 510 on step-up planetary 511. Output 512 of planetary 511 is coupled to an auxiliary thrust fan 513. This allows the torque from the lift engine to be transferred via power shaft 501 to drive shaft 502 and then to the auxiliary thrust fan 513. The torque from the lift engine may be removed from the auxiliary thrust fan 513 by moving shift fork 509 forward thereby disengaging selectable fan shaft 505 from spline 510.

In gearbox 500, either the auxiliary thrust fan 513 or the mast 508 may be coupled to the lift engine torque separately, which allows only one of the outputs—fan 513 or rotor mast 508—to turn at a time. Alternatively, both the auxiliary thrust fan 513 and rotor mast 508 may be coupled to the lift engine torque at the same time, which allows force to be generated by both fan 513 and by rotor blades attached to rotor mast 508. In another alternative embodiment, both the auxiliary thrust fan 513 and rotor mast 508 may be decoupled from the lift engine torque at the same time, which corresponds to a neutral transmission configuration in which torque is not applied either to a rotor mast 508 or to auxiliary thrust fan 513.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A foldable rotor system for a rotorcraft, comprising:
   a rotor assembly comprising one or more foldable rotor blades that are configured to move between an extend position and a folded position;
   an auxiliary fan that is configured to generate thrust for an aircraft;
   a proprotor gearbox configured to be selectively coupled either to the rotor assembly or to the auxiliary fan; and
   a pylon enclosing a portion of the rotor assembly, the auxiliary fan, and the proprotor gearbox.

2. The foldable rotor system of claim 1, wherein the proprotor gearbox further comprises:
   a multiplier planetary gear drive having an output coupled to the auxiliary fan.

3. The foldable rotor system of claim 2, wherein the multiplier planetary gear drive is configured to increase an output revolutions per minute compared to an input revolutions per minute.

4. The foldable rotor system of claim 1, wherein the proprotor gearbox further comprises:
   an inline engagement actuator configured to selectively couple the proprotor gearbox either to the rotor assembly or to the auxiliary fan.

5. The foldable rotor system of claim 1, further comprising:
   an inlet duct on the pylon, the inlet duct configured to provide airflow to the auxiliary fan.

6. The foldable rotor system of claim 1, wherein the pylon is mounted on a wing of an aircraft.

7. The foldable rotor system of claim 6, wherein the pylon is configured to rotate between a vertical position and a horizontal position, wherein rotating the extended rotor blades in the pylon-vertical position generates a lift force, and wherein rotating the extended rotor blades in the pylon-horizontal position generates a thrust force configured to drive the foldable rotor system in a forward direction.

8. The foldable rotor system of claim 1, further comprising:
   an engine configured to generate torque; and
   a rotor drive system configured to distribute the torque from the engine to the proprotor gearbox, wherein the proprotor gearbox is adapted to the torque either to the rotor assembly or to the auxiliary fan.

9. An aircraft, comprising:
   a fuselage;
   a wing attached to the fuselage at a first end of the wing;
   a proprotor assembly having a plurality of rotor blades, the proprotor assembly mounted on a second end of the wing, the rotor blades that are configured to move between an extend position and a folded position;
   an auxiliary fan mounted on the second end of the wing, the auxiliary fan configured to generate thrust for an aircraft;
   a proprotor gearbox configured to be selectively coupled to the rotor assembly or to the auxiliary fan;
   a first engine configured to generate torque; and
   a rotor drive system configured to distribute the torque from the first engine to the proprotor gearbox, wherein the proprotor gearbox is adapted to selectively transfer the torque either to the rotor assembly or to the auxiliary fan.

10. The aircraft of claim 9, further comprising:
    a second engine configured to generate a thrust force adapted to drive the aircraft in a forward direction.

11. The aircraft of claim 10, wherein the proprotor gearbox further comprises:
    a multiplier planetary gear drive having an output coupled to the auxiliary fan.

12. The aircraft of claim 11, wherein the multiplier planetary gear drive is configured to increase an output revolutions per minute compared to an input revolutions per minute.

13. The aircraft of claim 9, wherein the proprotor gearbox further comprises:
    an inline engagement actuator configured to selectively couple the proprotor gearbox either to the rotor assembly or to the auxiliary fan.

14. The aircraft of claim 13, further comprising:
    a pylon enclosing a portion of the rotor assembly, auxiliary fan, and proprotor gearbox.

15. The aircraft of claim 14, further comprising:
    an inlet duct on the pylon, the inlet duct configured to provide airflow to the auxiliary fan.

16. The aircraft of claim 14, wherein the pylon is configured to rotate between a vertical position and a horizontal position, wherein rotating the extended rotor blades in the pylon-vertical position generates a lift force, and wherein rotating the extended rotor blades in the pylon-horizontal position generates a thrust force configured to drive the aircraft in a forward direction.

17. The aircraft of claim 9, wherein the proprotor gearbox is configured to be coupled to both the rotor assembly and to the auxiliary fan simultaneously.

* * * * *